(12) United States Patent
Yang et al.

(10) Patent No.: US 9,603,041 B2
(45) Date of Patent: Mar. 21, 2017

(54) METHOD AND DEVICE FOR SENDING TRAFFIC INDICATION INFORMATION

(71) Applicant: ZTE CORPORATION, Shenzhen, Guangdong Province (CN)

(72) Inventors: Dan Yang, Shenzhen (CN); Kaiying Lv, Shenzhen (CN); Bo Sun, Shenzhen (CN); Jing Jiang, Shenzhen (CN); Nan Li, Shenzhen (CN); Zhiqiang Han, Shenzhen (CN); Weimin Xing, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 24 days.

(21) Appl. No.: 14/385,124

(22) PCT Filed: Jan. 17, 2013

(86) PCT No.: PCT/CN2013/070636
§ 371 (c)(1),
(2) Date: Sep. 12, 2014

(87) PCT Pub. No.: WO2013/135110
PCT Pub. Date: Sep. 19, 2013

(65) Prior Publication Data
US 2015/0043431 A1 Feb. 12, 2015

(30) Foreign Application Priority Data
Mar. 14, 2012 (CN) .......................... 2012 1 0066803

(51) Int. Cl.
H04W 24/10 (2009.01)
H04W 4/06 (2009.01)
(Continued)

(52) U.S. Cl.
CPC ............. *H04W 24/10* (2013.01); *H04W 4/06* (2013.01); *H04W 4/20* (2013.01); *H04W 48/12* (2013.01)

(58) Field of Classification Search
None
See application file for complete search history.

(56) References Cited

U.S. PATENT DOCUMENTS

| 9,060,349 | B2 * | 6/2015 | Seok | ..................... H04W 74/08 |
| 2004/0246983 | A1 * | 12/2004 | Kaatz | ................ H04W 52/0216 370/432 |

(Continued)

FOREIGN PATENT DOCUMENTS

| CN | 101277489 A | 10/2008 |
| CN | 101754479 A | 6/2010 |

(Continued)

OTHER PUBLICATIONS

International Search Report (Form PCT/ISA/210) for PCT/CN2013/070636 mailed Apr. 18, 2013.

*Primary Examiner* — Hassan Kizou
*Assistant Examiner* — Hashim Bhatti
(74) *Attorney, Agent, or Firm* — Koppel, Patrick, Heybl & Philpott

(57) ABSTRACT

Provided are a method and a device for sending traffic indication information. In the method, an AP sends a radio frame to multiple STAs associated with the AP, wherein the radio frame carries an indication field, and the indication field is used to indicate whether the radio frame carries traffic indication virtual bitmap information. According to the technical solution provided, in the case where the AP has no unicast cache data for any station, multiple STAs associated with the AP can know whether the AP has their respective unicast cache data to be sent.

20 Claims, 5 Drawing Sheets

(51) Int. Cl.
*H04W 4/20* (2009.01)
*H04W 48/12* (2009.01)

(56) References Cited

U.S. PATENT DOCUMENTS

2007/0268867 A1* 11/2007 Wentink ................ H04W 74/06
                                                        370/331
2008/0181156 A1*  7/2008 Ecclesine .......... H04W 52/0235
                                                        370/311

FOREIGN PATENT DOCUMENTS

| CN | 101835095 A | 9/2010 |
| EP | 2183887 A1 | 5/2010 |
| KR | 20040027150 A | 1/2004 |

* cited by examiner

| Octet number: | 1 | 1 | 1 | 1 | 1 | 1-251 |
|---|---|---|---|---|---|---|
| | Element ID | Length | DTIM count | DTIM period | Bitmap control | Partial virtual bitmap |
Fig. 1
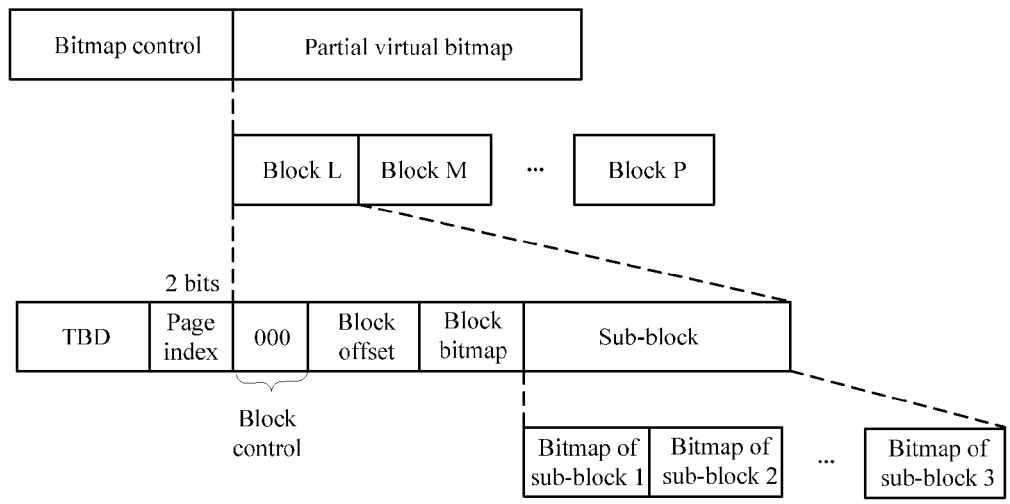
Fig. 2
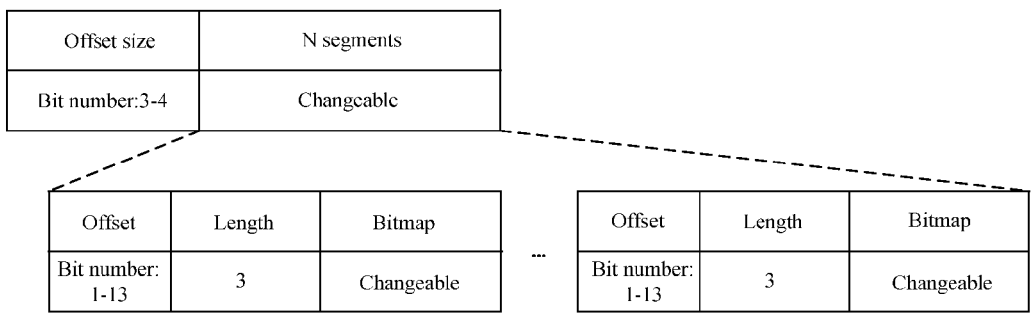
Fig. 3

METHOD AND DEVICE FOR SENDING TRAFFIC INDICATION INFORMATION

TECHNICAL FIELD

The disclosure relates to the field of communication, in particular to a method and device for sending traffic indication information.

BACKGROUND

At present, in the field of wireless network, with the rapid development of wireless local area network (WLAN), the application range of the WLAN are being widen day after day. In order to cope with various network requirements, the specification group of the Institute of Electrical and Electronic Engineers IEEE802.11 has issued a series of most ordinary WLAN technical standards, such as 802.11ah, 802.11b, 802.11g and 802.11n. Other task groups which are devoted to the development of improved standards of the existing 802.11 technology are established in succession subsequently. For example, with the development of the Internet of Things, the IEEE has established a 802.11ah task group, the primary task of which is to modify and enhance the medium access control (MAC) and physical (PHY) layer of the WLAN, so as to adapt to the requirements of networks such as a Smart Grid, a sensor network, an Environmental/Agricultural Monitoring and an Industrial Process Automation network.

In a wireless local area network, an access point (AP) and a plurality of non-AP stations (STAs) associated with this AP compose a Basic Service Set (BSS). Before using the service of the BSS, the STA needs to accomplish an authentication and association process with the AP. If the association succeeds, the AP allocates an association identifier (AID) to the STA, wherein the AID is the identity of the STA in the current BSS, i.e. this STA is able to be distinguished from other STAs via the AID; while STAs belonging to different BSSs may use the same AID. At the same time, when a plurality of BSS are connected via a Distribution System (DS), they can form an Extended Service Set (ESS). A plurality of STAs can also form a self-organizing wireless local network, which is called an independent BSS (IBSS), and the STAs in the IBSS can communicate directly with each other.

In the new WLAN application scenario defined by the 802.11ah task group, some typical examples require the amount of the supported user as large as possible. For example, during intelligent metre reading, it is required that at most 6000 stations can be supported under one BSS, each station is distributed with an AID during association, and the system require data of these stations to be reported periodically or non-periodically. The stations subordinated to these applications are powered substantially by a battery, and it is typically required that there is no need to change the battery in a long period of time. Therefore, these stations may enter the power saving mode when not performing any transceiving operation. For a station in a power saving mode, the AP notifies the station whether there is buffer data to be sent, by sending paging information, i.e. a Traffic Indication Map (TIM) information element.

FIG. 1 is a schematic diagram of a traffic indication map information element according to the relevant art. As shown in FIG. 1, the value of the length field of the TIM information element is the sum of a constant length (2 octets), the length of a bitmap control field and the length of the virtual bitmap (Partial Virtual Bitmap). The partial virtual bitmap in the TIM information element is the portion in the Traffic-Indication Virtual Bitmap (abbreviated as bitmap below) which indicates that there is station traffic, the octet number of the starting position of the partial virtual bitmap in the bitmap is N1, and the octet number of the end position thereof is N2. The bitmap has 251 octets in total, which is 2008 bits. Each bit corresponds to one AID, and when it is set to 1, it indicates that the buffer data of the station with this AID is to be sent. 7 octets in the bitmap control field are used for indicating a bitmap offset, and the value of the bitmap offset is set to N1/2. In the relevant art, N1 may be the maximum even number satisfying that the bit numbers 1~((N1*8)−1) in the bitmap are all 0, and N2 may be the minimum number satisfying that the bit numbers ((N2+1)*8)~2007 in the bitmap are all 0.

The length of the length field of the TIM information element is 1 octet, and each bit therein can further indicate a length of 1 octet, and the range that can be indicated thereby is 0~($2^8$−1) words. In addition, the bitmap offset is 7 bits, which can indicate an offset of an even number, and can at most indicate an offset of 254 octets. Limited to the value of the length field of the TIM information element, the partial virtual bitmap can only indicate whether stations corresponding to 2007 AIDs at most have buffer data to be sent, which is clearly not able to satisfy the requirement of supporting a large number of users.

Aiming at the above-mentioned problem, in the relevant art, the bitmap is statically segmented or dynamically segmented to support a large amount of users. In one beacon interval, the number of stations for which the AP can serve is limited. For the case where the number of users is large, the bitmap is compressed in segments, and theses compressed segments are sent in a plurality of beacon intervals respectively. A plurality of methods for compressing a TIM in segments are given in the relevant art. The TIM compressed in segments can be abbreviated as a compressed TIM, wherein the methods for compressing a TIM mainly include Hierarchical TIM compression and Offset+Bitmap compression. FIG. 2 is a schematic diagram of hierarchical TIM compression according to the relevant art. As shown in FIG. 2, hierarchical TIM compression mainly divides the TIM into a plurality of pages, divides each page into a plurality of blocks, and divides each block into a plurality of sub-blocks, thus carrying in the compressed TIM only non-zero sub-blocks of the bitmap, beneficial for reducing the amount of non-zero sub-blocks of the bitmap in the compressed TIM, wherein TBD (To Be Discussed) indicates that the settings of the field are undetermined. FIG. 3 is a schematic diagram of offset+bitmap compression according to the relevant art. As shown in FIG. 3, the offset+bitmap compression mainly indicates, by both segment offset and the position in the segment bitmap in the TIM of different segments, the AIDs of the stations the buffer data of which is to be sent by the current AP, thus supporting a large number of users, wherein an offset size field dynamically indicates the size of the offset field in a segment.

However, how the AP indicates a plurality of non-AP stations (STAs) in the case where there is not unicast buffer data of any station is not considered in the relevant art.

SUMMARY

The embodiments of disclosure provide a method and device for sending traffic indication information, so as to at least solve the problem in the relevant art that how an AP indicates a plurality of non-AP stations in the case where there is not unicast buffer data of any station is not considered.

According to an embodiment of the disclosure, provided is a method for sending traffic indication information.

In the method for sending traffic indication information according to the disclosure, an AP sends a radio frame to multiple STAs associated with the AP, wherein the radio frame carries an indication field, and the indication field is used to indicate whether the radio frame carries traffic indication virtual bitmap information.

In the described embodiment, a mode in which the above-mentioned AP sends the radio frame includes one of the following: a broadcast mode; and a multicast mode.

In the described embodiment, the above-mentioned radio frame may further carry one of the following: a TIM information element; and a compressed TIM information element.

In the described embodiment, the above-mentioned indication field may be set in the length field of the TIM information element.

In the described embodiment, the above-mentioned indication field is used for indicating a length value of the TIM information element, and when the length value indicated by the indication field is a preset value, the indication field is used for indicating that the radio frame does not carry the traffic indication virtual bitmap information.

In the described embodiment, the above-mentioned indication field may be set in a control field of the radio frame.

In the described embodiment, the above-mentioned control field includes one of the following: a bitmap control field of the TIM information element; and a block control field of the compressed TIM information element.

In the described embodiment, the above-mentioned indication field is used for indicating control information about the compressed TIM information element or the TIM information element, and when one or more bits of the indication field are set to be a preset value, the indication field is used for indicating that the radio frame does not carry the traffic indication virtual bitmap information.

In the described embodiment, the above-mentioned one or more bits may be at least one of the following: one or more discontinuous bits; and one or more bit combinations, with each bit combination being a plurality of continuous bits.

In the described embodiment, the above-mentioned indication field may be set in a combination of one or more fields in the radio frame.

In the described embodiment, when one or more bits of the indication field are set to be a predetermined value, the indication field is used for indicating whether the radio frame carries the traffic indication virtual bitmap information.

According to another embodiment of the disclosure, provided is a device for sending traffic indication information.

The device for sending traffic indication information according to the disclosure includes: a setting module, configured to set an indication field in a radio frame, wherein the indication field is used for indicating whether the radio frame carries the traffic indication virtual bitmap information; a sending module, configured to send the radio frame to a plurality of STAs associated with an AP.

In the described embodiment, a mode in which the above-mentioned AP sends the radio frame includes one of the following: a broadcast mode; and a multicast mode.

In the described embodiment, the above-mentioned radio frame may further carry at least one of the following: a TIM information element; and a compressed TIM information element.

In the described embodiment, the above-mentioned setting module includes: a first setting unit, configured to set the indication field in a length field of the TIM information element.

In the described embodiment, the above-mentioned indication field is used for indicating a length value of the TIM information element, and when the length value indicated by the indication field is a preset value, the indication field is used for indicating that the radio frame does not carry the traffic indication virtual bitmap information.

In the described embodiment, the above-mentioned setting module further includes: a second setting unit, configured to set the indication field in a control field of the radio frame.

In the described embodiment, the above-mentioned control field includes one of the following: a bitmap control field of the TIM information element; and a block control field of the compressed TIM information element.

In the described embodiment, the above-mentioned indication field is used for indicating control information about the compressed TIM information element or the TIM information element, and when one or more bits of the indication field are set to be a preset value, the indication field is used for indicating that the radio frame does not carry the traffic indication virtual bitmap information.

In the described embodiment, the above-mentioned setting module further includes: a third setting unit, configured to set the indication field in a combination of one or more fields in the radio frame.

In the described embodiment, when one or more bits of the above-mentioned indication field are set to be a predetermined value, the indication field is used for indicating whether the radio frame carries the traffic indication virtual bitmap information.

By means of the embodiments of the disclosure, by adding, at an AP, to a radio frame sent to a plurality of STAs associated with the AP, indication information for indicating whether the radio frame carries the traffic indication virtual bitmap information, so as to determine whether there is no unicast buffer data of any station, the problem in the relevant art of how to indicate a plurality of non-AP stations in the case where the AP does not have unicast buffer data of any station, thus achieving the effect that a plurality of STAs associated with the AP can learn about whether the AP has individual unicast buffer data thereof to be sent in the case where the AP does not have unicast buffer data of any station.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings:

FIG. 1 is a schematic diagram of a traffic indication map information element according to the relevant art;

FIG. 2 is a schematic diagram of hierarchical TIM compression according to the relevant art;

FIG. 3 is a schematic diagram of offset+bitmap compression according to the relevant art;

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 4:
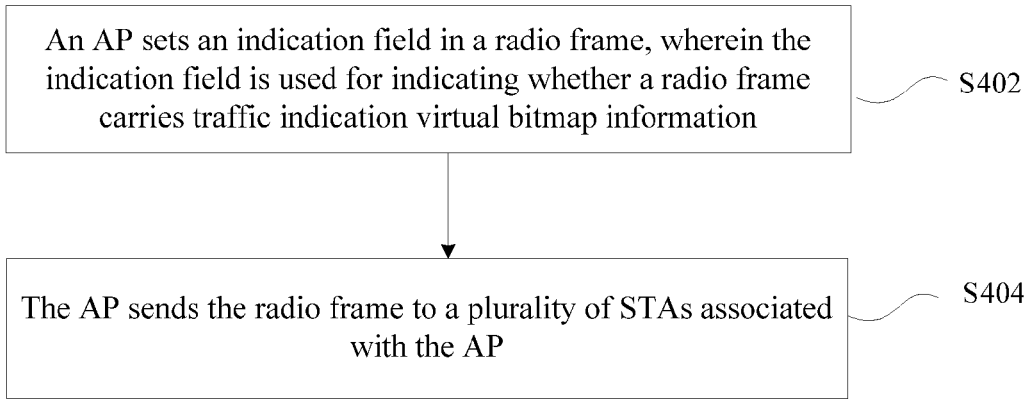
FIG. 4 is a flowchart of a method for sending traffic indication information according to the embodiments of the disclosure.

FIG. 4 is a flowchart of a method for sending traffic indication information according to the embodiments of the disclosure. As shown in FIG. 4, the method primarily includes the following processing steps:

step S402: an AP sets an indication field in a radio frame, wherein the indication field is used for indicating whether a radio frame carries traffic indication virtual bitmap information; and step S404: the AP sends the radio frame to a plurality of STAs associated with the AP.

How the AP indicates a plurality of non-AP stations in the case where there is not unicast buffer data of any station is not considered in the relevant art. By means of the method shown in FIG. 4, by adding to the radio frame issued by the AP indication information about whether the radio frame carries the traffic indication virtual bitmap information, a plurality of STAs associated with the AP further determine whether the STA itself has unicast buffer data to be sent according to the above-mentioned indication information when determining whether the radio frame carries the traffic indication virtual bitmap information, thereby achieving that a plurality of STAs associated with the AP can learn about whether there is unicast buffer data to be sent of the STA itself in the AP in the case where the AP does not have unicast buffer data of any station.

In a preferred implementation, the method of the above-mentioned AP sending a radio frame can include but is not limited to one of the following:

method 1, sending the radio frame by means of broadcast; and method 2, sending the radio frame by means of multicast.

In the described embodiment, the above-mentioned radio frame can may further carry one of the following:

(1) a TIM information element; and (2) a compressed TIM information element.

In a preferred embodiment, the above-mentioned indication field can be set in a TIM information element, can also be set in a compressed TIM information element, and can also set in another field other than the TIM information element and the compressed TIM information element in the radio frame.

In the described embodiment, the indication field in step S402 can be set in the length field of the TIM information element. The indication field is used for indicating a length value of the TIM information element, and when the length value indicated by the indication field is a preset value, the indication field is used for indicating that the radio frame does not carry the traffic indication virtual bitmap information. For example, when the length value indicated by the indication field is 2, it is indicated that the radio frame does not carry traffic indication virtual bitmap information.

Further description is made to the above-mentioned preferred implementation in combination with the embodiment shown in FIG. 5 below.

Figure 5:
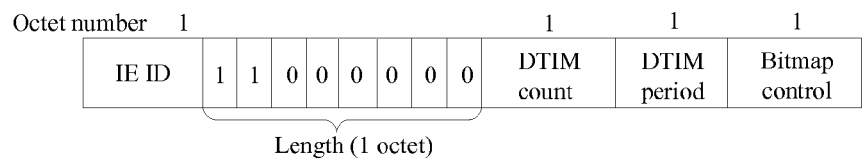
FIG. 5 is a schematic diagram of an indication field according to preferred embodiment 1 of the disclosure.

FIG. 5 is a schematic diagram of an indication field according to preferred embodiment 1 of the disclosure. As shown in FIG. 5, in this preferred embodiment, a BSS has an AP and a plurality of associated STAs, and the AP allocates a unique AID in the BSS for to the STA in the association process. The AP sends system information (beacon) to each station by broadcast, and carries a TIM information element. For a station in a power saving mode, whether the AP has buffer data of its own to be sent can be judged by wake up regularly to receive the beacon and detect the partial virtual bitmap in the TIM.

For a BSS with a large number of users, the AP sends a compressed TIM information element at a plurality of beacon intervals respectively. The AP can indicate whether buffer multicast data of a station is to be sent using bit 0 in the bit control field in the compressed TIM, and indicates whether the compressed TIM carries the traffic indication virtual bitmap information using the length field in the compressed TIM.

When the AP fix the length field in the TIM to be 3, it indicates that the TIM does not carry the traffic indication virtual bitmap information, that is, it indicates that there is no unicast buffer data of any station. A receiving station receives the TIM information element, and judges whether the TIM carries the traffic indication virtual bitmap information depending on whether the value of the length field in the TIM is set to be 3.

In the described embodiment, the indication field in step S402 can be set in the control field of the radio frame.

In the preferred implementation, the above-mentioned control field can include one of the following:

(1) a bitmap control field of the TIM information element; and (2) a block control field of the compressed TIM information element.

In the described embodiment, the above-mentioned indication field is used for indicating control information about the compressed TIM information element or the TIM information element, and when one or more bits of the indication field are set to be a preset value, the indication field is used for indicating that the radio frame does not carry the traffic indication virtual bitmap information.

In the preferred embodiment, the above-mentioned one or more bits may be but is not limited to one of the following:

(1) one or more discontinuous bits; and (2) one or more bit combinations, with each bit combination being a plurality of continuous bits.

Further description is made to the above-mentioned preferred implementation in combination with the preferred embodiments shown in FIG. 6 and FIG. 7 below.

Figure 6:
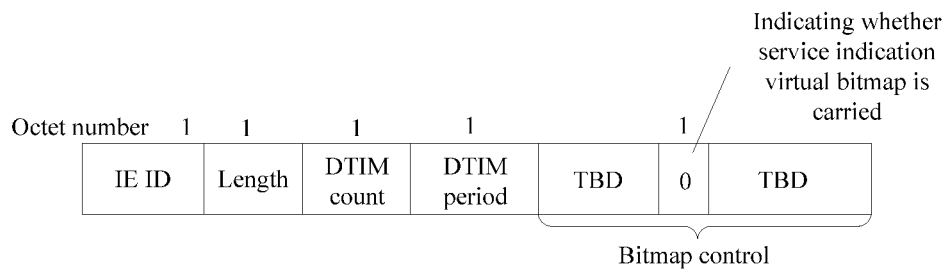
FIG. 6 is a schematic diagram of an indication field according to preferred embodiment 2 of the disclosure.

FIG. 6 is a schematic diagram of an indication field according to preferred embodiment 2 of the disclosure. As shown in FIG. 6, in this preferred embodiment, a BSS has an AP and a plurality of associated STAs, and the AP allocates a unique AID in the BSS for to the STA in the association process. The AP sends system information (beacon) to the stations by broadcast, and carries a TIM information element. For a station in a power saving mode, whether the AP has buffer data of its own to be sent can be judged by wake up regularly to receive the beacon and detect the partial virtual bitmap in the TIM.

For a BSS with a large number of users, the AP sends a compressed TIM information element at a plurality of beacon intervals respectively. The AP can indicate whether buffer multicast data of a station is to be sent using bit 0 in the bit control field in the compressed TIM, and indicates whether the compressed TIM carries the traffic indication virtual bitmap information using one or more bits in the bit control field in the compressed TIM.

1 bit is used in the bitmap control field to indicate whether the TIM carries the traffic indication virtual bitmap information, and when the bit is set to be 1, it indicates that the TIM carries the traffic indication virtual bitmap information, that is, the AP has unicast buffer data to be sent of certain stations; when the bit is set to be 0, it indicates that the TIM does not carry the traffic indication virtual bitmap information, that is, it indicates that there is not unicast buffer data of any station to be sent. A receiving station receives the TIM information element, and judges whether the TIM carries the traffic indication virtual bitmap information according to the set value of the indication information of the bitmap control field.

Figure 7:
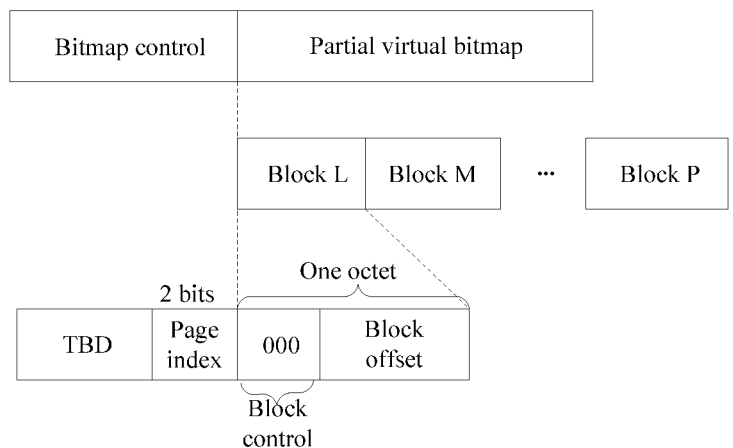
FIG. 7 is a schematic diagram of an indication field according to preferred embodiment 3 of the disclosure.

FIG. 7 is a schematic diagram of an indication field according to preferred embodiment 3 of the disclosure. As shown in FIG. 7, in this preferred embodiment, a BSS has an AP and a plurality of associated STAs, and the AP allocates a unique AID in the BSS for to the STA in the association process. The AP sends system information (beacon) to the stations by broadcast, and carries a TIM information element. For a station in a power saving mode, whether the AP has buffer data of its own to be sent can be judged by wake up regularly to receive the beacon and detect the partial virtual bitmap in the TIM.

For a BSS with a large number of users, the AP sends a compressed TIM information element at a plurality of beacon intervals respectively. The AP can indicate whether buffer multicast data of a station is to be sent using bit 0 in the bit control field in the compressed TIM, and indicates whether the compressed TIM carries the traffic indication virtual bitmap information using a certain specific combination in a block control field in the compressed TIM.

If 3 bits in the block control field in the compressed TIM is set to be 000, then it indicates that the compressed TIM does not carry the traffic indication virtual bitmap information, that is, it indicates that no unicast buffer data of any station is to be sent; and if this 3 bits are set to be another combination, then it indicates that the compressed TIM carries the traffic indication virtual bitmap information, that is, it indicates that unicast buffer data of certain stations is to be sent. A receiving station receives the compressed TIM information element, and judges whether the compressed TIM carries the traffic indication virtual bitmap information according to the set value of the block control field.

In the described embodiment, the above-mentioned indication field can be set in a combination of one or more fields in the radio frame. When one or more bits of the indication field are set to be a predetermined value, the indication field is used for indicating whether the radio frame carries the traffic indication virtual bitmap information.

In a preferred embodiment, the above-mentioned combination can be a combination of one or more offset field and a length field of a segment.

Further description is made to the above-mentioned preferred implementation in combination with the preferred embodiment shown in FIG. 8 below.

Figure 8:
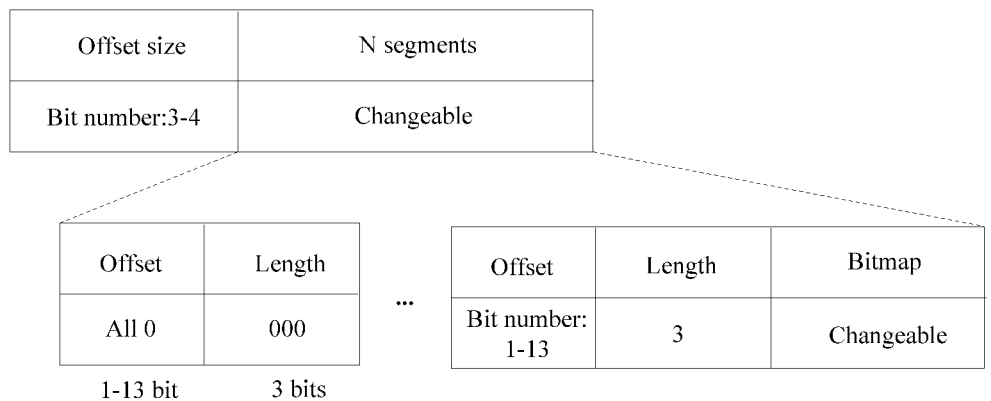
FIG. 8 is a schematic diagram of an indication field according to preferred embodiment 4 of the disclosure.

FIG. 8 is a schematic diagram of an indication field according to preferred embodiment 4 of the disclosure. As shown in FIG. 8, in this preferred embodiment, a BSS has an AP and a plurality of associated STAs, and the AP allocates a unique AID in the BSS for to the STA in the association process. The AP sends system information (beacon) to the stations by broadcast, and carries a TIM information element. For a station in a power saving mode, whether the AP has buffer data of its own to be sent can be judged by wake up regularly to receive the beacon and detect the partial virtual bitmap in the TIM.

For a BSS with a large number of users, the AP sends a compressed TIM information element at a plurality of beacon intervals respectively. The AP can indicate whether buffer multicast data of a station is to be sent using bit 0 in the bit control field in the compressed TIM, and indicates whether the compressed TIM carries the traffic indication virtual bitmap information using the combination of the offset field and the length field of the segment in the compressed TIM.

The offset in the compressed TIM is set to be all 0, and the length field of the segment is also set to be all 0, for indicating that the compressed TIM does not carry the traffic indication virtual bitmap information, that is, it indicates that there is not unicast buffer data of any station; and if the two fields are set to be another combination, then it indicates that the compressed TIM carries the traffic indication virtual bitmap information, that is, it indicates that there is unicast buffer data of some certain stations. A receiving station receives the compressed TIM information element, and judges whether the compressed TIM carries the traffic indication virtual bitmap information according to the value of the combination of the offset field and the length field of the segment in the compressed TIM.

Figure 9:
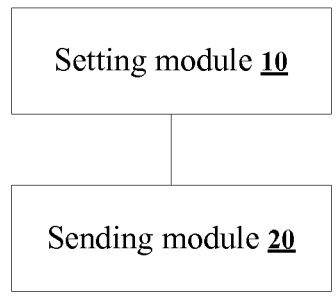
FIG. 9 is a structural block diagram of a device for sending traffic indication information according to the embodiments of the disclosure.

FIG. 9 is a structural block diagram of a device for sending traffic indication information according to an embodiment of the disclosure. The device for sending traffic indication information shown in FIG. 9 mainly includes: a setting module 10, configured to set an indication field in a radio frame, wherein the indication field is used for indicating whether the radio frame carries the traffic indication virtual bitmap information. A sending module 20 is configured to send the radio frame to a plurality of STAs associated with an AP.

The usage of the device as shown in FIG. 9 solves the problem in the relevant art of how to indicate a plurality of non-AP stations in the case where the AP does not have unicast buffer data of any station, thereby achieving the effect that a plurality of STAs associated with the AP can learn whether the STAs themselves have unicast buffer data to be sent in the case where the AP does not have unicast buffer data of any station.

In a preferred implementation, the method of the above-mentioned AP sending a radio frame can include but is not limited to one of the following:

method 1, sending the radio frame by means of broadcast; and method 2, sending the radio frame by means of multicast.

In the described embodiment, the above-mentioned radio frame can may further carry one of the following:

(1) a TIM information element; and (2) a compressed TIM information element.

Figure 10:
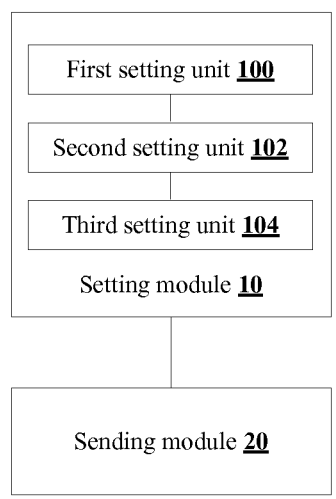
FIG. 10 is a structural block diagram of a device for sending traffic indication information according to a preferred embodiment of the disclosure.

In the described embodiment, as shown in FIG. 10, the above-mentioned setting module 10 can include: a first setting unit 100, configured to set the indication field in a length field of the TIM information element. The indication field is used for indicating a length value of the TIM information element, and when the length value indicated by the indication field is a preset value, the indication field is used for indicating that the radio frame does not carry the traffic indication virtual bitmap information.

In the described embodiment, as shown in FIG. 10, the above-mentioned setting module can further include: a second setting unit 102, configured to set the indication field in a control field of the radio frame.

In a preferred implementation, the above-mentioned control field can include but is not limited to one of the following:

(1) a bitmap control field of the TIM information element; and (2) a block control field of the compressed TIM information element.

In the described embodiment, the above-mentioned indication field is used for indicating control information about the compressed TIM information element or the TIM information element, and when one or more bits of the indication field are set to be a preset value, the indication field is used for indicating that the radio frame does not carry the traffic indication virtual bitmap information.

In the described embodiment, the above-mentioned one or more bits may be but is not limited to one of the following:

(1) one or more discontinuous bits; and (2) one or more bit combinations, with each bit combination being a plurality of continuous bits.

In the described embodiment, as shown in FIG. 10, the above-mentioned setting module 10 can further include: a third setting unit 104, configured to set the indication field in a combination of one or more fields in the radio frame. When one or more bits of the indication field are set to be a predetermined value, the indication field is used for indicating whether the radio frame carries the traffic indication virtual bitmap information.

It needs to be noted that the preferred operation mode of combining each module shown in FIG. 9 and FIG. 10 with one another can refer to the preferred implementation of FIG. 4 to FIG. 8, which will not be described again here.

It can be seen from the description above that the above-mentioned embodiments have realized the following technical effect (it needs to be noted that these effects are effects that some preferred embodiments can reach): it is realized that, in the case where the AP does not have unicast buffer data of any station, a plurality of STAs associated with the AP can learn the STAs themselves have unicast buffer data to be sent.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection as defined by the claims of the disclosure.

What is claimed is:

1. A method for sending traffic indication information, comprising:

an access point (AP) sending a radio frame to a plurality of non-AP stations (STAs) associated with the AP, wherein the radio frame carries an indication, and the indication is used for indicating whether the radio frame carries traffic indication virtual bitmap information;

the indication is a preset value of a length field of a TIM (traffic indication map) information element, and the preset value is used for indicating that the radio frame does not carry the traffic indication virtual bitmap information; or the indication is used for indicating control information about a compressed TIM information element or the TIM information element, and when one or more bits of the indication are set to be a preset value, the indication is used for indicating that the radio frame does not carry the traffic indication virtual bitmap information.

2. The method according to claim 1, wherein a mode in which the AP sends the radio frame comprises one of the following:

a broadcast mode; and a multicast mode.

3. The method according to claim 1, wherein the radio frame further carries at least one of the following:

the traffic indication map (TIM) information element; and the compressed traffic indication map (TIM) information element.

4. The method according to claim 3, wherein the indication is set in a length field of the TIM information element.

5. The method according to claim 4, wherein the indication is used for indicating a length value of the TIM information element, and when the length value indicated by the indication is a preset value, the indication is used for indicating that the radio frame does not carry the traffic indication virtual bitmap information.

6. The method according to claim 3, wherein the indication is set in a control field of the radio frame.

7. The method according to claim 6, wherein the control field comprises one of the following:

a bitmap control field of the TIM information element; and a block control field of the compressed TIM information element.

8. The method according to claim 7, wherein the indication is used for indicating control information about the compressed TIM information element or the TIM information element, and when one or more bits of the indication are set to be a preset value, the indication is used for indicating that the radio frame does not carry the traffic indication virtual bitmap information.

9. The method according to claim 8, wherein the one or more bits are at least one of the following:
one or more intermittent bits; and
one or more bit combinations, with each bit combination being a plurality of sequential bits.

10. The method according to claim 1, wherein the indication is set in a combination of one or more fields of the radio frame.

11. The method according to claim 10, wherein when one or more bits of the indication are set to be a predetermined value, the indication is used for indicating whether the radio frame carries the traffic indication virtual bitmap information.

12. An access point, comprising a processor coupled with a storage device, and wherein the processor is configured to execute a programming unit stored in the storage device, wherein the programming unit comprises:
a setting module, configured to set an indication in a radio frame, wherein the indication is used for indicating whether the radio frame carries traffic indication virtual bitmap information; and
a sending module, connected to the setting module and configured to send the radio frame to a plurality of non-AP stations (STAs) associated with an access point (AP);
the indication is a preset value of a length field of a TIM (traffic indication map) information element, and the preset value is used for indicating that the radio frame does not carry the traffic indication virtual bitmap information;
the indication is used for indicating control information about a compressed TIM information element or the TIM information element, and when one or more bits of the indication are set to be a preset value, the indication is used for indicating that the radio frame does not carry the traffic indication virtual bitmap information.

13. The access point according to claim 12, wherein the radio frame further carries at least one of the following:
the traffic indication map (TIM) information element; and
the compressed traffic indication map (TIM) information element.

14. The access point according to claim 13, wherein the setting module comprises:
a first setting unit, configured to set the indication in a length field of the TIM information element.

15. The access point according to claim 14, wherein
the indication is used for indicating a length value of the TIM information element, and when the length value indicated by the indication is a preset value, the indication is used for indicating that the radio frame does not carry the traffic indication virtual bitmap information.

16. The access point according to claim 14, wherein the setting module further comprises:
a second setting unit, connected to the first setting unit and configured to set the indication in a control field of the radio frame.

17. The access point according to claim 16, wherein the control field comprises one of the following:
a bitmap control field of the TIM information element; and
a block control field of the compressed TIM information element.

18. The access point according to claim 17, wherein
the indication is used for indicating control information about the compressed TIM information element or the TIM information element, and when one or more bits of the indication are set to be a preset value, the indication is used for indicating that the radio frame does not carry the traffic indication virtual bitmap information.

19. The access point according to claim 16, wherein the setting module further comprises:
a third setting unit, connected to the second setting unit and configured to set the indication in a combination of one or more fields of the radio frame.

20. The access point according to claim 19, wherein when one or more bits of the indication are set to be a predetermined value, the indication is used for indicating whether the radio frame carries the traffic indication virtual bitmap information.

* * * * *